Oct. 17, 1961  W. PRECHT ET AL  3,004,907
FUEL TUBE ELEMENT AND METHOD OF PREPARING THE SAME
Filed June 19, 1958

INVENTORS
WALTER PRECHT
RAYMOND J. GECKLE
JOHN R. BEDELL
BY Benjamin G. Weil
ATTORNEY

United States Patent Office 3,004,907
Patented Oct. 17, 1961

---

3,004,907
FUEL TUBE ELEMENT AND METHOD OF PREPARING THE SAME
Walter Precht, Baltimore, and Raymond J. Geckle, Dundalk, Md., and John R. Bedell, Smithtown, N.Y., assignors to The Martin Company, Middle River, Md., a corporation of Maryland
Filed June 19, 1958, Ser. No. 743,029
7 Claims. (Cl. 204—154.2)

This invention relates to nuclear reactors and more particularly to the fuel elements thereof and to methods of fabrication of such elements.

Nuclear reactors have been designed which utilize fuel elements of various configurations such as rod, flat plate and tubes. In the co-pending application of Tibor F. Nagey, Jack Hunter and William Maxwell, entitled, "Transportable Nuclear Reactor Power Plant," S. N. 684,501 filed September 17, 1957, now abandoned, a nuclear reactor is disclosed in which the fuel elements of the present invention may be used. This nuclear reactor includes a core containing bundles of tubular fuel elements having a tubular cermet core clad on the inner and outer cylindrical surfaces with unalloyed aluminum tubes. The cermet core is derived from aluminum powder and uranium dioxide powder which are intimately mixed to effect a uniform distribution of the uranium dioxide, $UO_2$ particles. The two claddings are bonded to the $Al:UO_2$ core in order that no thermal barrier to heat flow from the core to the cladding is presented.

The fabrication of such tubular fuel elements has involved considerable difficulty because of the necessity of maintaining close tolerances in the thickness of the claddings and of insuring a void-free bond between the cladding and the core. In order to obtain satisfactory performance from fuel elements during reactor operation, heat transfer characteristics must be standardized. Irregularities in the cladding thickness serve to produce temperature differentials along the fuel element surface, and these temperature differentials in turn set up stresses in the cladding which may be deleterious to the structural stability of the element. Void spaces between the cladding and core are also undesirable for the same reasons. Moreover, because of the greatly reduced rate of heat transfer across a void it is possible for a hot-spot to develop in the region of the void. In such regions the core temperature is abnormally high, and excessive temperature differentials build up from the center of the core to its surface. Under these conditions, the core may melt or the cladding may burn through. It is possible that both melting and burn-through may occur. The dangers attendant upon core melting or cladding burn-through are well appreciated by reactor engineers.

It has been found that air entrapped in tubular fuel elements will cause blistering if certain precautions are not taken. Blistering produces void spaces and weakens the cladding and, consequently, it must be avoided.

Objects and features of this invention are the provision of uniform leak-proof fuel tube elements in which the cladding is intimately bonded to the fuel core and in which entrapped air is at a minimum or present in negligible amounts.

Further objects and features of the invention are the provision of novel fabrication methods for the production of fuel tube elements having the above-mentioned features and advantages.

Additional objects and features of this invention are the provision of novel fuel tube elements and relatively simple methods for their fabrication.

Still other objects and features of the invention are the provision of methods of fabricating tubular fuel elements with great rapidity and in which the diameter and lengths of the elements as well as the thicknesses of the claddings may be readily varied to meet particular reactor requirements.

Further objects and features of the invention are the provision of novel methods of fuel tube element fabrication that are cheaper than those currently available because less materials is required for their fabrication.

Other objects and features of the invention will become apparent from the following specification and the accompanying drawing wherein.

Figure 1:
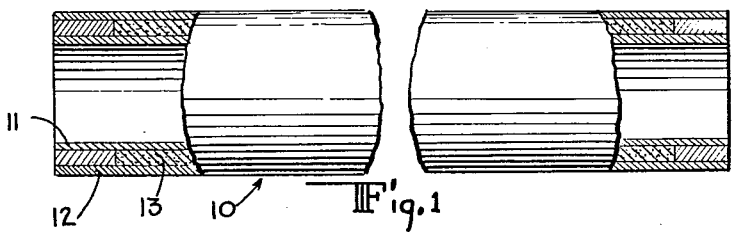
FIGURE 1 is a fragmentary longitudinal section of a fuel tube element embodying the invention.

Referring to the drawing and first to FIGURE 1, a tubular fuel element is denoted generally by the reference character 10. This element consists of an inner tubular aluminum cladding 11, an outer tubular aluminum cladding 12 and a tubular fissionable core 13 of aluminum and uranium oxide, $Al:UO_2$, sandwiched between the two claddings. The surfaces of the two claddings 11 and 12 are in intimately bonded contact respectively with the inner and outer surfaces of the core 13 and substantially all air initially existing between and in the claddings has been exhausted. Preferably the claddings are of unalloyed substantially pure aluminum identified commercially as 2–S aluminum.

Figure 2:
FIGURE 2 is a diagrammatic illustration of a first step in the process of producing the elements.
Figure 3:
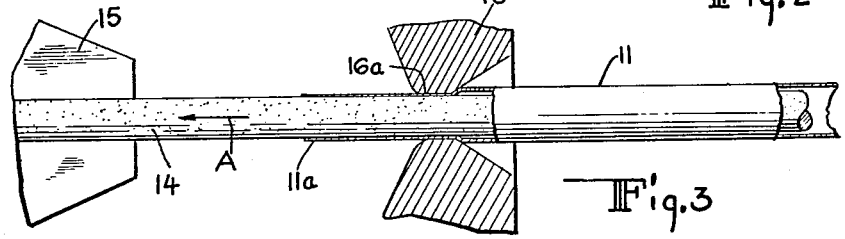
FIGURE 3 is a similar view of a succeeding die drawing operational step.

In the fabrication of the tubular core elements 10 above-described, a cold roll mandrel 14 of steel or other suitable metal is heated in air so that its surface becomes covered with an inert oxide coating. In the alternative, the surface of the mandrel can be coated by painting or the like with magnesium oxide, MgO. This coating serves to prevent bonding to the mandrel of the tubular components that are mounted on the mandrel for die drawing operations. A tubular metallic inner aluminum cladding 11 of somewhat larger internal diameter than the outer diameter of the oxide coated mandrel 14 is then slipped over the mandrel. A tip 11a of this tubular cladding 11 is then swaged onto the oxide coated surface of the mandrel 14 as is illustrated in FIGURE 2. The mandrel 14 is then gripped by conventional gripping mechanism 15 as illustrated in FIGURE 3 to draw it and the tube 11 through the reducing die 16. The direction of drawing which is illustrated by the arrow A in FIGURE 3 is such as to introduce the swaged tip 11a of the cladding 11 into the opening 16a of the die 16 at the start of the drawing process which is performed cold i.e. at usual room temperature. As the drawing proceeds in the direction of the arrow A of FIGURE 3, the entire surface of the cladding 11 is acted upon by the die to form and bring the cladding into surface contact with the oxidized surface of the mandrel 14 and also reduce its wall thickness to desired dimensions. Upon completion of the cold drawing operation through the die 16, the mandrel 14 bearing the die-drawn inner cladding 11 thereon is subjected to chemical cleaning action to rid the exposed surface of the die drawn cladding of grease and surface oxide.

Chemical cleaning of aluminum surfaces for such purposes is conventional. For example, the surface may be cleaned in a cycle including:

(1) Degreasing in a vapor of perchloroethylene,
(2) Soaking in an acidic deoxidizer solution at room temperature, the solution consisting, for example, of 16 ounces of Oakite 34 (a commercially available alkaline cleaner), per gallon of tap water for approximately three minutes, (3) Rinsing in water, (4) Soaking for about one minute in an alkaline cleaner solution consisting, for example, of 10 ounces of "Oakite 130" (a commercially available alkaline cleaner) per gallon of tap water at 60° C., (5) Rinsing in water, (6) Repeating Step 2 for a period of approximately four minutes, (7) Rinsing thoroughly in water, (8) Dipping in distilled water, (9) Vacuum drying at 30° C. for about one-half hour.

Any other conventional aluminum cleaning may be practiced. For example, chemical cleaners that will not etch or discolor the surface of the aluminum excessively can be used. A cleaner of this type may be made from sodium carbonate and sodium phosphates suitably inhibited with sodium silicate to eliminate excessive etching action.

A bright fast finish can be produced by a dip in a hot 5–15% caustic soda solution followed by a dip in strong nitric acid. A smooth bright finish can be produced by immersion in a solution containing about 2% by volume of concentrated hydrofluoric acid and 10% by volume of nitric acid. The solution should not be allowed to become too warm. For removing oxide fims and stains, a dip in a solution containing about 10% sulfuric acid and 3% chromic acid, operated at 160° F. will be found effective.

The selection of any particular chemical cleaning procedure of the aluminum surfaces will depend upon the general nature of the undesirable surface contamination.

Figure 4:
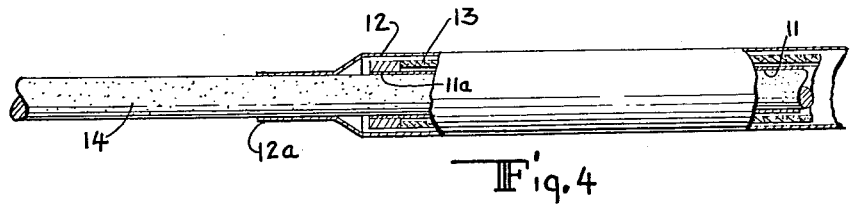
FIGURE 4 is a similar view of the next succeeding step.
Figure 5:
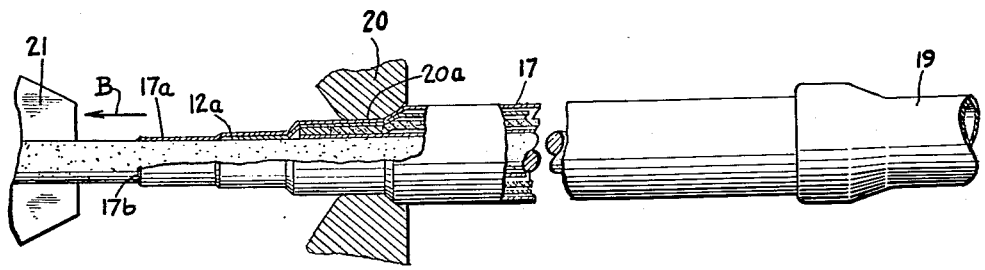
FIGURE 5 illustrates a further step in the preparation of the tubular elements.

An aluminum:uranium oxide tubular core having an internal diameter slightly in excess of outer diameter of the cold drawn inner cladding 11 on the mandrel 14 is provided. The core is fabricated by powder metallurgy methods from a mixture of aluminum and uranium dioxide powders containing up to 50 volumes percent uranium dioxide ($UO_2$). Inactive end sections of aluminum are provided at both ends of the core so that in the final product the fissionable material is completely encased by protective cladding. The core is chemically cleaned in the same manner as the aluminum cladding. This core 13 is slipped over the chemically cleaned drawn inner cladding on the mandrel 14. Then a chemically cleaned, tubular outer metal cladding 12 of the same material as the inner cladding is slipped over the so mounted core 13. Chemical cleaning of the outer cladding is the same or similar to that effected on the inner cladding. The tip 11a of the inner cladding 11 and tip 12a of the outer cladding 12 are successively again swaged onto the mandrel 14 as illustrated in FIGURE 4. Thereafter a stainless steel tube 17 as seen in FIGURE 5 is slipped over the assembled claddings 11 and 12 and core 13 on the mandrel 15. This stainless steel tube 17 is then swaged at 17a to the surface of the mandrel 14 directly in advance of the swaging 12a of outer cladding 12 and in addition the swaged tip 17a of the stainless steel protective tube 17 is sealed to the mandrel 14 as by silver solder at 17b to provide a leak-proof joint therewith. A rubber hose 19 is placed over the unswaged end of the assembly. The hose 19 is connected to a vacuum pump which evacuates air present between the cladding and the core and between the outer stainless steel tubing and the outer cladding. The assembly of mandrel, claddings 11 and 12 and core 13 together with the outer protective stainless steel tubing sheath 17 is then transferred to a furnace so that the unswaged end attached to the rubber hose 19 projects slightly outside the hot section of the furnace, thereby preventing damage to the hose. While under vacuum the assembly is heated to the temperature of the furnace, which is set at 575° C. Temperatures in the range 550° C. to 600° C. may also be used. Air trapped in the claddings and core is driven off during heating and is evacuated.

When the assembly has come to temperature, annealing of the aluminum will occur. Evacuation is protracted for about one hour, and is followed by hot drawing of the assembly through a die maintained at about 575° C. The mandrel 14 with the swaged portion 17a is extended through the die opening 20a and the assembly is drawn through the latter in the direction of the arrow B of FIGURE 5, by the grippers 21, thus drawing with it the assembly mounted on the mandrel 14. This drawing operation is effected at a relatively slow rate.

It is desired to maintain the assembly at a temperature of about 550° C. to 600° C. for approximately one hour so that molecular migration of aluminum atoms from the core to the aluminum cladding, and vice versa, will produce a metallurgical bond at the core-cladding interface. Photomicrographs of the metallurgically bonded interface between an aluminum cladding and a core derived from well-mixed aluminum and uranium dioxide, $UO_2$ powders show that an excellent bond is obtained. Moreover, there is a complete absence of blisters on the aluminum cladding. This is attributable to the degassing step, wherein gases occluded in the aluminum are driven out.

Fuel elements of different composition than $Al:UO_2$ clad with Al will be bonded at different temperatures and these temperatures are well known in the art.

The opening 20a of the die is dimensioned to provide the required reduction in diameter of the sheath tubing 17, and the claddings 11 and 12 and core 13 assembled on the mandrel 14 during the slow drawing operation of the mandrel 14 through the die 20. To facilitate or minimize friction, during drawing the die opening surfaces 20a may be lubricated with an appropriate lubricant of conventional type available commercially. One lubricant found suitable for such surfaces is colloidal graphite in a water vehicle consisting of microscopic particles of graphite dispersed in water. Such a product is available commercially under the trademark "Aquadag" a product of Acheson Colloids Corporation, 1635 Washington Avenue, Port Huron, Michigan. Other lubricants having similar properties may also be used.

The hot die drawing of the assembly results in firm intimate bonding of the claddings 11 and 12 respectively to the surfaces of the aluminum uranium oxide core 13. Several passes of the assembly through dies of diminishing diameter may be performed to obtain the desired reduction in cross sectional area.

Upon completion of the die drawing and after removal of the rubber hose 19 and cooling of the assembly to substantially room temperature, the stainless steel sheath tube 17 may be slit and stripped or peeled from the assembly. The oxidized mandrel 14 then likewise is easily withdrawn from the inner cladding 11. The assembly remaining is then an aluminum clad, aluminum-uranium oxide core of the type illustrated in FIGURE 1 wherein the core 13 is sandwiched between the inner and outer claddings 11 and 12 and intimately bonded to the surfaces thereof. The function of the stainless steel tube 17 used during die drawing is to provide a convenient chamber containing the core-cladding assembly which may be evacuated to withdraw entrapped air between adjoining surfaces of the claddings and core immediately prior to and during die drawing thus eliminating air pockets within the die drawn assembly and tubular fuel element resulting from the drawing which might impair operation or prevent uniform reactor operation.

A feature of the invention resulting from the process described is that the lengths of the tubular elements may be selected as desired since there is no limitation to the exact dimensions required, for example, of a split hot-press die which had been used heretofore for the formation of specifically dimensioned elements. In addition, the die drawing operations of this invention are speedier and the product resulting has cladding of uniform thickness. In the split die type of element formation heretofore practiced, the cladding was finned and not uniform in thickness requiring additional machining operations for elimination of the fins and final sizing of the cladding.

Further features of the process involved in the instant invention are that the resulting tubular elements can be subjected to additional forming and shaping operations as desired. Moreover, their diameters and lengths and wall thicknesses can readily be adjusted for particular reactor requirements without requiring expensive new sets of hot-press dies for each new set of conditions.

While specific features and details of the invention have been disclosed, variations within the scope of the appended claims are possible and are contemplated. There is no intention, therefore, of limitation to the exact disclosure herein made.

What is claimed is:

1. That improvement in the process of preparing clad nuclear reactor fuel elements of tubular type comprising the steps of providing a mandrel, treating the surface of the latter to prevent bonding thereon of components of the element, mounting a first aluminum tube on the mandrel, swaging a tip of said first tube to the mandrel, cold drawing said first tube on said mandrel to impart a selected thickness thereto and to conform its inner surface to the surface of the mandrel, chemically cleaning the said first tube, mounting a tubular core of a cermet containing aluminum and uranium dioxide over the cold drawn first tube, mounting a second aluminum tube over the so positioned core, swaging a tip of the second aluminum tube to the mandrel, mounting a protective tube over said second tube, swaging a tip of said protective tube to the mandrel and sealing it in leak-proof manner to the mandrel, elevating the temperature of the assembled components and of a drawing die, applying a vacuum to the assembled components and while maintaining said vacuum and the elevated temperature, hot drawing the component assembly through the heated die to effect metallurgical bonding of the adjoining surfaces between the first and second tubes and the core, and thereafter removing the protective tube.

2. The improvement of claim 1 wherein said elevated temperature is approximately 575° C.

3. A clad core reactor element prepared according to the process of claim 1.

4. That improvement in the process of preparing clad nuclear reactor fuel elements of tubular type comprising the steps of providing a mandrel, treating the surface of the latter to prevent bonding thereon of components of the element, mounting a tubular aluminum inner cladding on the mandrel, swaging a tip of said tubular inner cladding to the mandrel, cold drawing the inner cladding on said mandrel to impart desired thickness thereto and to conform its inner surface to the surface of the mandrel, chemically cleaning the inner cladding, mounting a tubular core of a cermet containing aluminum and uranium dioxide over the drawn inner cladding on the mandrel, mounting an outer aluminum cladding over the so positioned core, swaging a tip of the outer cladding to the mandrel, mounting a protective stainless steel tube over the so mounted outer cladding, swaging a tip of said stainless steel tube to the mandrel, sealing the latter swaged tip in leak-proof manner to the mandrel, elevating the temperature of the assembly and of a drawing die, applying a vacuum to withdraw gases from between the assembled components and, while maintaining said vacuum and said elevated temperature, hot drawing the assembly through the heated die to effect metallurgical bonding of the adjoining surfaces between the aluminum claddings and the core, and thereafter removing the protective stainless steel tube.

5. The improvement of claim 4 wherein said elevated temperature is approximately 575° C.

6. The improvement of claim 4 wherein said elevated temperature lies at a sintering temperature of the components of the element.

7. A clad core reactor element prepared according to the process of claim 4.

References Cited in the file of this patent

UNITED STATES PATENTS

| | | |
|---|---|---|
| 1,599,356 | Auspitzer | Sept. 7, 1926 |
| 2,761,207 | Dodd et al. | Sept. 4, 1956 |
| 2,820,751 | Saller | Jan. 21, 1958 |